(12) United States Patent
Phillips et al.

(10) Patent No.: US 12,737,428 B2
(45) Date of Patent: Sep. 15, 2026

(54) AUTOMATED DECISIONING SYSTEM FOR ACCEPTABILITY OF USER PRIVACY NOTICES AND CONTROLS ON A USER INTERFACE

(71) Applicant: GOOGLE LLC, Mountain View, CA (US)

(72) Inventors: Jeremy Phillips, Mountain View, CA (US); Rupak Banerjee, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 187 days.

(21) Appl. No.: 18/634,479

(22) Filed: Apr. 12, 2024

(65) Prior Publication Data

US 2024/0346104 A1 Oct. 17, 2024

Related U.S. Application Data

(60) Provisional application No. 63/495,775, filed on Apr. 12, 2023.

(51) Int. Cl.
*G06F 16/957* (2019.01)
*G06F 16/958* (2019.01)

(52) U.S. Cl.
CPC ........ *G06F 16/9577* (2019.01); *G06F 16/958* (2019.01)

(58) Field of Classification Search
CPC .......................... G06F 16/9577; G06F 16/958
See application file for complete search history.

(56) References Cited

U.S. PATENT DOCUMENTS 8,225,197 B1 * 7/2012 Szewczyk ............... G06F 9/451 715/241
8,392,822 B2 * 3/2013 Hungerford .......... G06F 16/958 715/234
8,479,289 B1 * 7/2013 Krishnappa ........... G06F 21/554 726/25
9,361,631 B2 * 6/2016 Meyer ................ G06Q 30/0256
10,026,098 B2 * 7/2018 Meyer ..................... H04L 67/02
10,198,408 B1 * 2/2019 Commisso ............ G06F 40/143
10,397,243 B2 * 8/2019 Johns .................. H04L 63/1408
(Continued)

*Primary Examiner* — Kenny Nguyen
(74) *Attorney, Agent, or Firm* — MARSHALL, GERSTEIN & BORUN LLP

(57) ABSTRACT

To determine whether a web resource complies with a policy for displaying an informational notice, a system obtaining a Document Object Model (DOM) representation of the web resource, the DOM representation specifying a hierarchy of pages and including instructions for displaying content elements. The system traverses the DOM representation of the web resource to determine whether the web resource includes the informational notice, including calculating a likelihood that a content element corresponds to the informational notice based on one or more keywords associated with the informational notice. In response to determining that the content element corresponds to the informational notice, the system determines a set of visual parameters of the content element, and determines whether the web resource is configured to display the content element according to a visibility metric. The system further generates an indication of whether the web resource contains the informational notice according to the visibility metric.

18 Claims, 4 Drawing Sheets

(56) References Cited

U.S. PATENT DOCUMENTS 10,498,769 B2 * 12/2019 Sartor .................... H04L 63/20
10,789,315 B1 * 9/2020 Zoller .................. G06F 40/221
10,891,393 B2 * 1/2021 Currier ............... G06F 21/6245
11,010,492 B1 * 5/2021 Kayyoor ............. G06F 16/9535
11,074,361 B2 * 7/2021 Karatzoglou ......... G06F 16/907
11,423,105 B1 * 8/2022 Zoller ................ G06F 16/9535
11,704,378 B1 * 7/2023 Zoller .................... G06F 16/34
715/234
2009/0320090 A1 * 12/2009 Hungerford .......... G06F 16/958
726/1
2010/0121773 A1 * 5/2010 Currier .................. G06Q 30/00
705/347
2011/0173071 A1 * 7/2011 Meyer .................... G06Q 30/02
705/14.54
2016/0028742 A1 * 1/2016 Johns .................... H04L 63/123
726/26
2016/0306784 A1 * 10/2016 Bradley .................. G10L 25/48
2017/0116642 A1 * 4/2017 Meyer ................ G06Q 30/0277
2018/0324064 A1 * 11/2018 Tola .................... H04L 67/1097
2019/0213241 A1 * 7/2019 Ying ..................... G06F 40/143
2020/0322346 A1 * 10/2020 Van Rensburg ...... H04L 63/205

* cited by examiner

AUTOMATED DECISIONING SYSTEM FOR ACCEPTABILITY OF USER PRIVACY NOTICES AND CONTROLS ON A USER INTERFACE

FIELD OF THE DISCLOSURE

This disclosure relates to techniques for user privacy notices and/or controls, and more particularly to techniques for assessing acceptability of such notices and/or controls when provided on user interfaces.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many website owners and application ("app") providers must conform to a number of requirements regarding notices (e.g., for transparency), controls (e.g., for consent), etc. Although some platforms can display controls automatically for all hosted content, it can be difficult for a website or app company to determine whether a website or app is correctly configured to provide the necessary notices and/or controls on its interface(s).

SUMMARY

This disclosure discloses techniques for automatically screening a website to ensure the website has the appropriate (e.g., per regulatory constraints and/or in-line with user privacy expectations) notice(s) and/or control(s). While this disclosure primarily refers to websites, it is understood that many techniques described herein may instead be applied to other types of user interfaces, such as user interfaces provided by a mobile application.

Various mechanisms may be used to determine what to screen for, to perform the screening, to store the results, and/or to provide notification to the appropriate device or entity (e.g., website owner) to allow for rectification of errant conditions, if any exist.

In some implementations, a system retrieves a Document Object Model (DOM) representation of a web resource. The system traverses the DOM representation to determine whether the web pages that make up the hierarchy of the web resource contain certain keywords or phrases associated with an informational notice. This determination can yield a probability metric, depending on how many of the keywords are present, the distance between the keywords in the text, etc. In some scenarios, the system automatically detects the language of the web resource and translates the keywords into the language of the informational notice. The system then determines how visible the informational notice is, based on DOM parameters such as, for example, the pixel size of the notice, the positioning of the informational notice relative to an edge of the screen, the font size, and so on.

An example embodiment is a method for determining whether a web resource complies with a policy for displaying an informational notice. The method is implemented in a computing system and comprises obtaining a DOM representation of the web resource, the DOM representation specifying a hierarchy of pages and including instructions for displaying content elements; traversing the DOM representation of the web resource to determine whether the web resource includes the informational notice, including calculating a likelihood that a content element corresponds to the informational notice based on one or more keywords associated with the informational notice; in response to determining that the content element corresponds to the informational notice (i) determining a set of visual parameters of the content element and (ii) determining whether the web resource is configured to display the content element according to a visibility metric; and generating an indication of whether the web resource contains the informational notice according to the visibility metric.

DETAILED DESCRIPTION OF THE DRAWINGS

Figure 1:
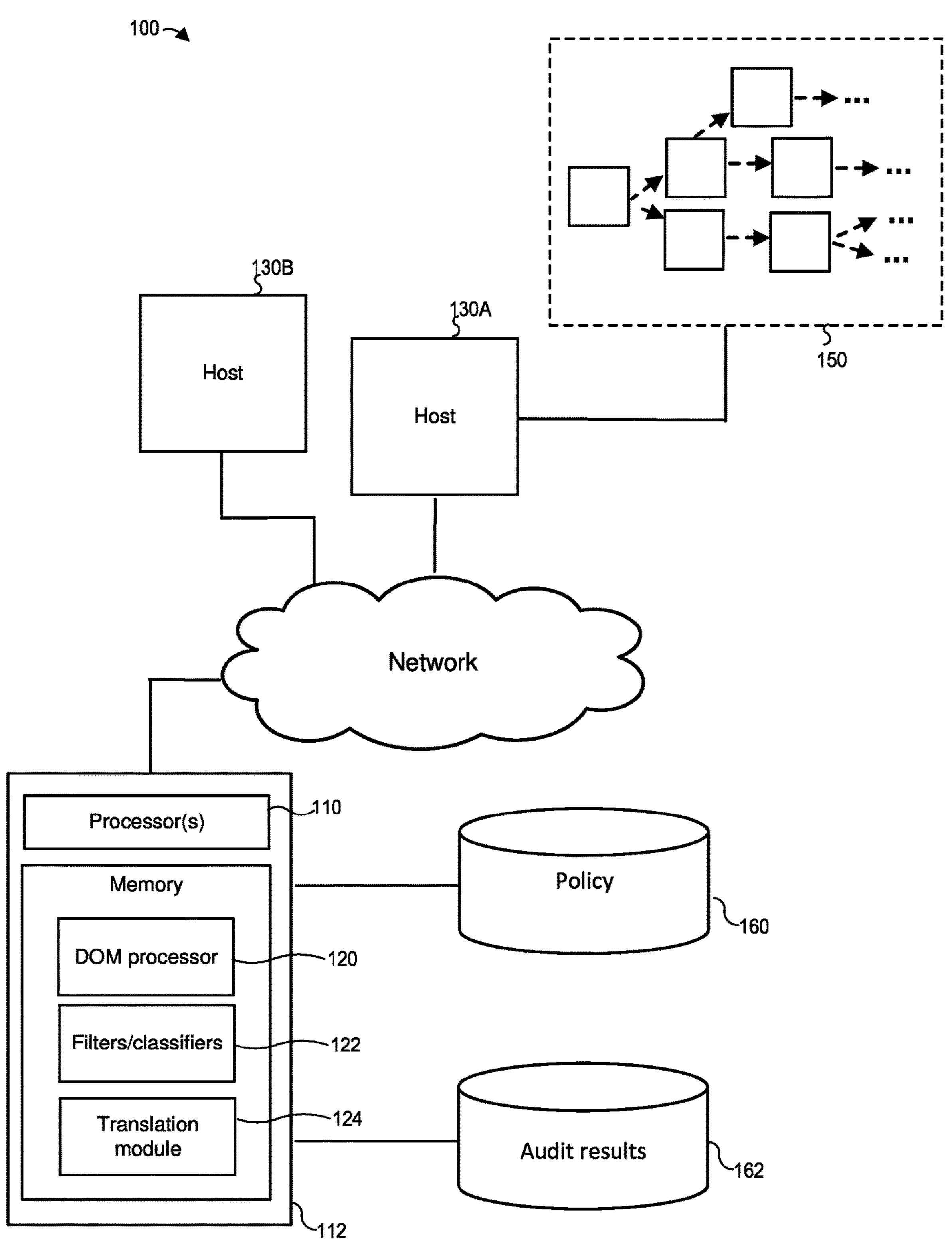
FIG. 1 is a block diagram of an example system in which the techniques of this disclosure for automatically determining dependencies between datasets can be implemented.

FIG. 1 illustrates a system 100 including a server 102 that can implement the techniques of this disclosure to automatically analyze web resources to determine the presence of certain content (e.g., a certain notice) and visibility of this content via a user interface, e.g., within a browser window or in a special-purpose application.

The server 102 includes one or more processors 110 configured to execute software instructions stored in memory 114 (i.e., one or more non-transitory, computer-readable media), including a DOM processor 120, a filter/classifier module 122, and a translation module 124. In the example shown, the server 102 is connected to hosts 130A and 130B. In other examples the server 102 may be connected to more or fewer hosts. The host 130A stores web content 150 having a certain structure which the DOM processor 120 analyzes during operation as discussed further below. In the example implementation of FIG. 1, the server 102 is also connected to a database 160 storing policy rules for analyzing web content and an audit results database 162 storing the results of processing the web content.

In an example implementation, the server 102 receives a list of hosts to review, such as the host 130A, checks the compliance of the corresponding web content in accordance with the policy stored in the database 160, and stores the audit results in the database 162. As a more specific example, the policy database 160 may store a schedule according to which the server 102 executes an automated task and reviews the hosts 130A and 130B.

Alternatively or additionally, the server 102 can provide an additional control and a corresponding interface via which an operator (e.g., an auditor) can initiate the review of a specific host. This interactive control can provide more consistency between manual and automated audits, as an auditor can respond as needed to intermediate changes to the web content 150. Because web pages generally change relatively infrequently, an automated audit process that is at least as frequent as, for example, a weekly manual audit may in some cases address changes to web content 150 sufficiently quickly. Further, an auditor can choose to actuate this control when the result of a recent automated task identifies potential non-compliance, i.e., absence of a notice or poor visibility of the notice. However, in some scenarios, manually initiating the automated audit can result in a relatively low delay associated with analyzing the structure of the web content 150.

Generally, the server 102 (e.g., processor(s) 110), and/or one or more other computing systems or devices not shown in FIG. 1, may perform operations corresponding to a number of stages, some or all of which may be automated. These stages may include, for example:

1. Selecting the sites of websites and pre-loading those sites into a tool.
2. Calling a microservice that exposes the code of a website (e.g., downloading a DOM of a website given the URL of the website). This may include scanning the microservice for the presence of certain transparency-related and/or consent-related language, and/or for example. Transparency and/or consent language may be stored in a library (e.g., in database 160) called via a microservices call.
3. Calling a microservice that exposes integration with a third-party consent management platform.
4. Calling a microservice with notice (and/or control, etc.) acceptability criteria based on a scoring mechanism corresponding to a particular policy.
5. Applying the scoring mechanism.
6. Reporting outcome information such as "pass", "fail", "manual override", etc., into the tool (e.g., for storage in database 162).
7. Activating a warning notification to the site owner into the tool.
8. Activating an enforcement job for the site, and/or other remedial or mitigating actions.

In some implementations, the server 102 (e.g., processor(s) 110 when executing instructions stored in memory 114) executes a method for determining whether a web resource complies with a policy for displaying an informational notice. The method may be implemented as stages 1-6 above, for example, or a subset thereof (e.g., stages 5 and 6). The method can include obtaining a DOM representation of the web resource, where the DOM representation specifies a hierarchy of pages and including instructions for displaying content elements. The method can also include traversing the DOM representation of the web resource to determine whether the web resource includes the informational notice, including calculating a likelihood that a content element corresponds to the informational notice based on one or more keywords associated with the informational notice. The method can further include, in response to determining that the content element corresponds to the informational notice, (1) determining a set of visual parameters of the content element, and (2) determining whether the web resource is configured to display the content element according to a visibility metric. The method can further include generating an indication of whether the web resource contains the informational notice according to the visibility metric.

In some implementations, the determining of whether the web resource is configured to display the content element according to the visibility metric includes determining whether an entirety of a box enclosing the information notice is within a visible screen, and/or determining, using the obtained DOM representation, a font size of text included in the content element.

In some implementations, the determining of the set of visual parameters of the content element includes determining a position of the content element using the obtained DOM representation, determining a height and a width of the content element using the obtained DOM representation, and/or determining a height and a width of a screen in which the web resource is presented.

Figure 2:
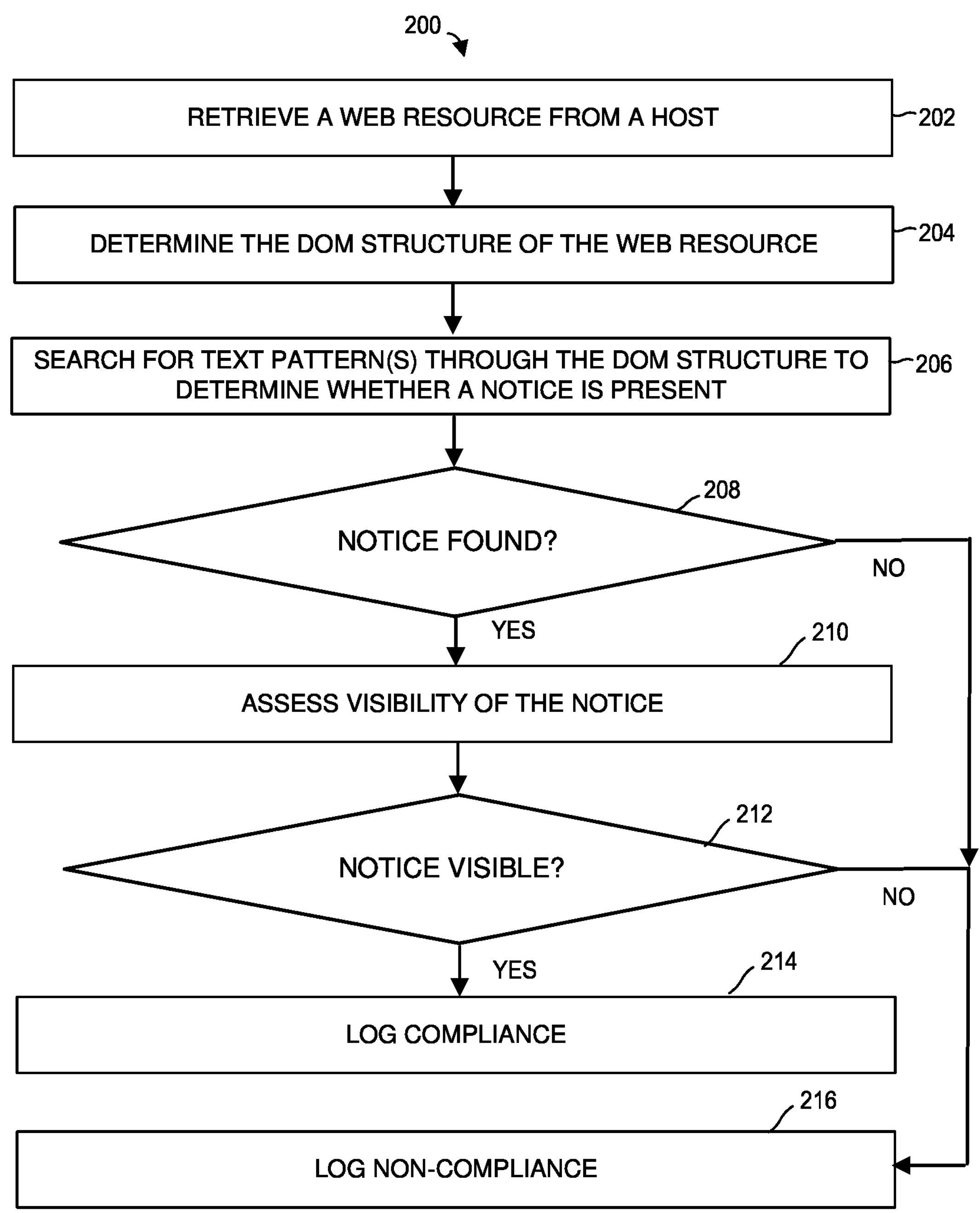
FIG. 2 is a flow diagram of an example method for discovering dependencies between datasets, which can be implemented in the system of FIG. 1.

FIG. 2 is a flow diagram of an example method 200 that can be implemented in the system 100 (e.g., by processor(s) 110 of server 102), for example. The method 200 may correspond to stages 1 through 6 of the eight numbered stages listed above, for example, or a subset thereof (e.g., stages 5 and 6). At block 202, the system retrieves a web resource from a host (e.g., corresponding to web content 150 from host 130A). At block 204, the system determines the DOM structure of the web resource.

As a more specific example, the system at block 204 can produce the following example DOM structure:

<DIV (Element) class="fc-consent-root"> Position (0, 0) Size (W,H):(1024,1024)
<DIV (Element) class="fc-dialog-overlay"> Position (0, 0) Size (W,H):(1024,1024)
<DIV (Element) class="fc-dialog-container"> Position (256, 297) Size (W,H):(512,609)
<DIV (Element) class="fc-dialog fc-choice-dialogue"> Position (256, 207) Size (W,H):(512, 609)
<DIV (Element) class="fc-dialog-content"> Position (257, 207) Size (W,H):(510,489)
<DIV (Element) class="fc-dialog-scrollable-content"> Position (257, 208) Size (W,H):(510, 489)
<DIV (Element) class="fc-header fc-dialog-restricted-content"> Position (304, 208) Size (W,H):(416,72)
<H2 (Element) class="fc-cite-macro-logo fc-header-image-container"> Position (304, 232) Size (W,H):(416,72)
<DIV (Element) class="fc-header-image-container"> Position (408, 232) Size (W,H):(208, 66)
<IMG (Element) class="fc-header-image" src="https://source.com/abcdefgh" Position (304, 232) Size (W,H):(416,72)
<H1 (Element)> Position (304, 316) Size (W,H):(416,72)
. . . .

At block 206, the system searches for text patterns through the DOM structure to determine whether a notice is present. For example, to determine whether the web resource contains a certain privacy notice, the system may determine whether the content element includes associated keywords (e.g., phrases) such as "using cookies," "using data for ads personalization," "sharing data with third parties," etc.

In some implementations, if the system finds certain keywords, the system determines that a notice exists. If the system instead finds that certain keywords exist while others do not (e.g., if certain keywords relating to privacy are present but certain other keywords relating to consent notices are not present), the system may generate a flag or other data indicating that a manual review will be needed on this site. If the system finds that no (or less than a threshold amount, etc.) keywords exist, the system may conclude that the site does not include a consent notice.

In some implementations, the system collects text from all notices (e.g., consent notices) found through crawling (e.g., using basic privacy words to search on the DOM tree, and isolating text-based nodes that hit the search criteria, etc.), and processes the text using a text-clustering algorithm with added weight on privacy words. After generating the clusters, the system determines, for each cluster, whether the representative words in the cluster indicate a sufficient consent notice.

Figure 4:
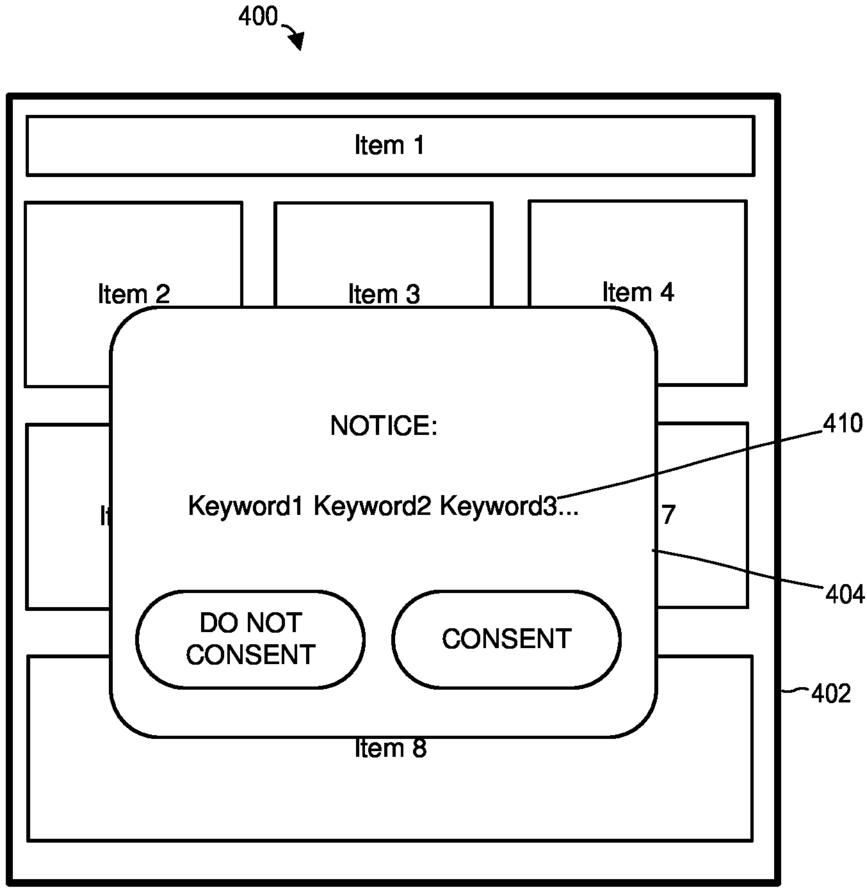
FIG. 4 illustrates an example web resource with multiple content elements, including an informational notice.

Next, at block 208, the system determines whether a notice is found based on the output of block 206. If a notice is found, the flow proceeds to block 210 to assess the visibility of the notice. To this end, the system can first determine the dimensions of the box that contains the notice, using the DOM structure. The system them determines whether the visible screen contains the entirety of the box based on the dimensions of the box, the dimensions of the visible screen, and the position of the box (see, e.g., FIG. 4, where the entirety of the content element 404 that includes a notice with certain keywords 410 is within the visible screen 400). A box smaller than the visible screen can still be only partially visible if the counterpoint of the box is too close to one of the edges of the screen, for example. The system also can determine whether the size and/or font of the text of the notice (see, e.g., the font of keywords 410 in FIG. 4) is above a certain threshold to qualify as visible. As used herein, references to a determination of whether a box or information is "visible" can (in some implementations) mean determining whether the box or information is "sufficiently" visible (e.g., greater than some threshold percentage of the box is visible, and/or at least all of the text in the box is visible, etc.), rather than determining only whether any portion of the box or information is visible, and rather than determining only whether an entirety of the box or information is visible.

If the system determines at block 212 that the notice is visible, the flow proceeds to block 214, where the system logs compliance by storing data indicative of compliance in a memory, and potentially triggers a display of information indicating compliance. Otherwise, if the system determines at block 212 that the notice is not visible, the flow proceeds to block 216, where the system logs non-compliance, and potentially triggers a display of information indicating non-compliance. In some implementations, block 216 includes storing and/or triggering display of data indicating not only non-compliance, but also one or more specific reasons for non-compliance (e.g., "font weight too small," or "privacy notice partially offscreen," etc.).

Figure 3:
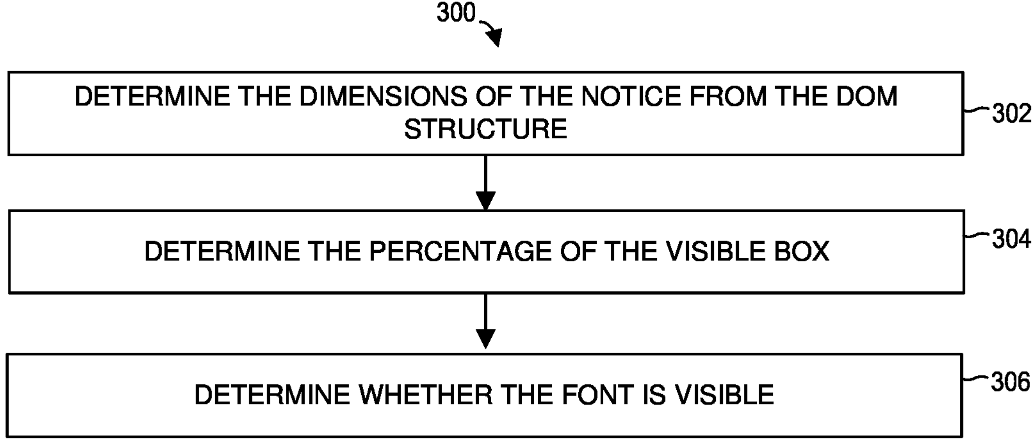
FIG. 3 is a flow diagram of an example method for generating a numeric metric indicative of a level of risk associated with a dataset, which can be implemented in the system of FIG. 1.

FIG. 3 illustrates an example method 300 for determining whether a notice is visible. The method 300 may be implemented by the server 102 (e.g., by processor(s) 110), for example. The method 300 begins at block 302, where the system determines the dimensions of the notice from the DOM structure. Next, at block 304, the system determines the percentage of the box visible for the given view. At block 306, the system determines whether the font is visible.

As noted above, FIG. 4 illustrates a visible screen 400 of an example web resource/page (e.g., corresponding to web content 150) with multiple content elements. Within the visible screen 400 of the web page, a content element 404 provides an informational notice. In this example, the content element 404 is entirely visible on the user interface 402. The information notice includes certain keywords 410, which the system (e.g., server 102) may analyze as discussed above. The content element 404 of this example also includes user-selectable controls for consenting or not consenting to an agreement, etc., as set forth in the informational notice.

The following description may be applied to the description above.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method for determining whether a web resource complies with a policy for displaying an informational notice, the method implemented in a computing system and comprising:

obtaining a Document Object Model (DOM) representation of the web resource, the DOM representation specifying a hierarchy of pages and including instructions for displaying content elements;

traversing the DOM representation of the web resource to determine whether the web resource includes the informational notice, including calculating a likelihood that a content element corresponds to the informational notice based on one or more keywords associated with the informational notice;

in response to determining that the content element corresponds to the informational notice:

determining a set of visual parameters of the content element, and determining whether the set of visual parameters of the content element complies with a visibility metric; and displaying information indicating compliance or noncompliance with the visibility metric based on the determining of whether the set of visual parameters of the content element complies with the visibility metric, including:

when determining that the set of visual parameters of the content element complies with the visibility metric, displaying information indicating compliance with the visibility metric; and when determining that the set of visual parameters of the content element does not comply with the visibility metric, displaying information indicating noncompliance with the visibility metric.

2. The method of claim 1, wherein the determining of whether the set of visual parameters of the content element complies with the visibility metric includes:

determining whether an entirety of a box enclosing the informational notice is within a visible screen.

3. The method of claim 1, wherein the determining of the set of visual parameters of the content element includes:

determining a position of the content element using the obtained DOM representation.

4. The method of claim 1, wherein the determining of the set of visual parameters of the content element includes:

determining a height and a width of the content element using the obtained DOM representation.

5. The method of claim 4, further comprising:

determining a height and a width of a screen in which the web resource is presented.

6. The method of claim 1, wherein the determining of whether the set of visual parameters of the content element complies with the visibility metric includes:

determining a font size of text included in the content element, using the obtained DOM representation.

7. A computing system for determining whether a web resource complies with a policy for displaying an informational notice, the computing system comprising:

one or more processors; and memory storing instructions that, when executed by the one or more processors, cause the one or more processors to obtain a Document Object Model (DOM) representation of the web resource, the DOM representation specifying a hierarchy of pages and including instructions for displaying content elements, traverse the DOM representation of the web resource to determine whether the web resource includes the informational notice, at least by calculating a likelihood that a content element corresponds to the informational notice based on one or more keywords associated with the informational notice, in response to determining that the content element corresponds to the informational notice, determine a set of visual parameters of the content element and determine whether the set of visual parameters of the content element complies with a visibility metric, and display information indicating compliance or noncompliance with the visibility metric based on the determining of whether the set of visual parameters of the content element complies with the visibility metric, including:

when determining that the set of visual parameters of the content element complies with the visibility metric, display information indicating compliance with the visibility metric; and when determining that the set of visual parameters of the content element does not comply with the visibility metric, display information indicating noncompliance with the visibility metric.

8. The computing system of claim 7, wherein the determining of whether the set of visual parameters of the content element complies with the visibility metric includes:

determining whether an entirety of a box enclosing the informational notice is within a visible screen.

9. The computing system of claim 7, wherein the determining of the set of visual parameters of the content element includes:

determining a position of the content element using the obtained DOM representation.

10. The computing system of claim 7, wherein the determining of the set of visual parameters of the content element includes:

determining a height and a width of the content element using the obtained DOM representation.

11. The computing system of claim 10, wherein the instructions further cause the one or more processors to:

determine a height and a width of a screen in which the web resource is presented.

12. The computing system of claim 7, wherein the determining of whether the set of visual parameters of the content element complies with the visibility metric includes:

determining a font size of text included in the content element, using the obtained DOM representation.

13. One or more non-transitory, computer-readable media for determining whether a web resource complies with a policy for displaying an informational notice, the one or more non-transitory, computer-readable media storing instructions that, when executed by one or more processors of a computing system, cause the one or more processors to:

obtain a Document Object Model (DOM) representation of the web resource, the DOM representation specifying a hierarchy of pages and including instructions for displaying content elements;

traverse the DOM representation of the web resource to determine whether the web resource includes the informational notice, at least by calculating a likelihood that a content element corresponds to the informational notice based on one or more keywords associated with the informational notice;

in response to determining that the content element corresponds to the informational notice, determine a set of visual parameters of the content element and determine whether the set of visual parameters of the content element complies with a visibility metric; and display information indicating compliance or noncompliance with the visibility metric based on the determining of whether the set of visual parameters of the content element complies with the visibility metric, including:

when determining that the set of visual parameters of the content element complies with the visibility metric, display information indicating compliance with the visibility metric; and when determining that the set of visual parameters of the content element does not comply with the visibility metric, display information indicating noncompliance with the visibility metric.

14. The one or more non-transitory, computer-readable media of claim 13, wherein the determining of whether the set of visual parameters of the content element complies with the visibility metric includes:

determining whether an entirety of a box enclosing the informational notice is within a visible screen.

15. The one or more non-transitory, computer-readable media of claim 13, wherein the determining of the set of visual parameters of the content element includes:

determining a position of the content element using the obtained DOM representation.

16. The one or more non-transitory, computer-readable media of claim 13, wherein the determining of the set of visual parameters of the content element includes:

determining a height and a width of the content element using the obtained DOM representation.

17. The one or more non-transitory, computer-readable media of claim 16, wherein the instructions further cause the one or more processors to:

determine a height and a width of a screen in which the web resource is presented.

18. The one or more non-transitory, computer-readable media of claim 13, wherein the determining of whether the set of visual parameters of the content element complies with the visibility metric includes:

determining a font size of text included in the content element, using the obtained DOM representation.

* * * * *